United States Patent
Sueda et al.

(10) Patent No.: US 10,247,453 B2
(45) Date of Patent: Apr. 2, 2019

(54) COMPRESSOR MODULE

(71) Applicant: MITSUBISHI HEAVY INDUSTRIES COMPRESSOR CORPORATION, Tokyo (JP)

(72) Inventors: Hidenori Sueda, Hiroshima (JP); Masahiro Hayashi, Hiroshima (JP); Tomoaki Takeda, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 5 days.

(21) Appl. No.: 15/524,722

(22) PCT Filed: Nov. 10, 2014

(86) PCT No.: PCT/JP2014/079702
§ 371 (c)(1),
(2) Date: May 5, 2017

(87) PCT Pub. No.: WO2016/075734
PCT Pub. Date: May 19, 2016

(65) Prior Publication Data
US 2017/0321935 A1   Nov. 9, 2017

(51) Int. Cl.
*F25B 31/02*   (2006.01)
*F25B 41/04*   (2006.01)
(Continued)

(52) U.S. Cl.
CPC .............. *F25B 31/02* (2013.01); *B63H 21/30* (2013.01); *F04B 41/00* (2013.01); *F16M 3/00* (2013.01);
(Continued)

(58) Field of Classification Search
CPC .... F25B 2400/071; F25B 31/02; F04B 41/00; F01C 21/007
See application file for complete search history.

(56) References Cited

U.S. PATENT DOCUMENTS 5,626,468 A * 5/1997 Muir ..................... F04B 35/002
248/639
7,975,505 B2 * 7/2011 Struck .................. F01D 15/005
62/401
(Continued)

FOREIGN PATENT DOCUMENTS

CN   202253992 U   5/2012
JP   2011-162038 A   8/2011
(Continued)

OTHER PUBLICATIONS

International Search Report dated Feb. 3, 2015 in PCT Application No. PCT/JP2014/079702 with an English Translation.
(Continued)

*Primary Examiner* — Christopher R Zerphey
(74) *Attorney, Agent, or Firm* — Birch, Stewart, Kolasch & Birch, LLP

(57) ABSTRACT

A compressor module (1) comprises:
 a floor member (3);
 a gas cooler (24) mounted on the floor member (3);
 a compressor skid (10) disposed on a side of the gas cooler (24) opposite to where the floor member (3) is located, the compressor skid (10) being connected to the gas cooler (24); and
 a leg portion (15) connected to the compressor skid (10) and fixed to the floor member (3) that supports the compressor skid (10), the leg portion (15) providing a gap to dispose the gas cooler (24) between the floor member (3) and the compressor skid (10).

2 Claims, 4 Drawing Sheets

(51) Int. Cl.
*F04B 41/00* (2006.01)
*B63H 21/30* (2006.01)
*F16M 3/00* (2006.01)

(52) U.S. Cl.
CPC ............ *F25B 41/04* (2013.01); *F25B 41/043* (2013.01); *F25B 2400/071* (2013.01); *F25B 2400/23* (2013.01); *F25B 2500/01* (2013.01)

(56) References Cited

U.S. PATENT DOCUMENTS

| | | | |
|---|---|---|---|
| 8,381,578 B2 * | 2/2013 | Sweeney | B63C 11/42 405/154.1 |
| 9,506,462 B2 * | 11/2016 | Oba | F04B 39/06 |
| 9,828,980 B2 * | 11/2017 | Maier | F04B 39/12 |
| 2013/0160479 A1 | 6/2013 | Webster et al. | |
| 2013/0251555 A1 | 9/2013 | DePaz et al. | |
| 2013/0266440 A1 | 10/2013 | Ota et al. | |

FOREIGN PATENT DOCUMENTS

| | | |
|---|---|---|
| JP | 2012-177337 A | 9/2012 |
| WO | WO 2007/045975 A1 | 4/2007 |

OTHER PUBLICATIONS

Written Opinion dated Feb. 3, 2015 in PCT Application No. PCT/JP2014/079702 with an English Translation.

* cited by examiner

COMPRESSOR MODULE

TECHNICAL FIELD

The present invention relates to a compressor module.

BACKGROUND ART

Arrangements of a compressor and a drive unit therefor on a frame are known (for example, see Patent Document 1). Additionally, for large equipment that include a compressor and a drive unit therefor, a module structure in which a compressor and a drive unit therefor are assembled is employed as a floor member on which maintenance workers stand.

CITATION LIST

Patent Document

Patent Document 1: US Application Publication No. 2013/0251555

SUMMARY OF INVENTION

Technical Problems

For equipment provided with such a module structure that includes a compressor and a drive unit therefor installed on a marine vessel or floating object, there are limits on installation area and loading weight and also a demand for the equipment to be given a lower center of gravity to reduce the effect of the motions of the marine vessel or floating object. To reduce the installation area of the equipment, an assembly has been considered in which a plurality of floor members are stacked on top of one another thus arranging apparatuses and lines in a height direction. However, reducing the center of gravity of the equipment arranged as such is difficult. Also, the lines of the equipment must be led in the height direction, and the overall weight is difficult to reduce.

The present invention has an object of providing a compressor module that is low weight and has a low center of gravity.

Solution to Problem

An aspect of the present invention is a compressor module, comprising: a floor member; a gas cooler mounted on the floor member; a compressor skid disposed on a side of the gas cooler opposite to where the floor member is located, the compressor skid being connected to the gas cooler; and a leg portion connected to the compressor skid and fixed to the floor member that supports the compressor skid, the leg portion providing a gap to dispose the gas cooler between the floor member and the compressor skid.

The compressor skid preferably comprises a compressor that raises pressure of a gas and sends the gas to the gas cooler, a drive unit that drives the compressor, and a base plate on which the compressor and the drive unit are mounted. The leg portion preferably comprises a damping device fixed to the base plate, and a coupling member fixed to the damping device and fixed to the floor member.

The damping device preferably comprises a first damping device, a second damping device disposed at a position spaced away from the first damping device, and a third damping device disposed at a position spaced away from the first damping device and the second damping device. The coupling member preferably comprises a first coupling member that couples to the first damping device and the floor member, a second coupling member that couples to the second damping device and the floor member, and a third coupling member that couples to the third damping device and the floor member; and at least a portion of the gas cooler is disposed within a space formed between the first coupling member, the second coupling member, and the third coupling member.

The compressor module according to any one of the aspects described above preferably further comprises: a second floor member disposed on a side of the compressor skid opposite to where the floor member is located; a first line mounted on the second floor member through which a gas supplied to the compressor skid flows; a second line mounted on the second floor member through which a gas supplied from the gas cooler flows; and a valve disposed on the second floor member for changing a flow rate of a gas in the first line and/or the second line.

The compressor module according to any one of the aspects described above preferably further comprises a drain separator fixed to the floor member and connected to the gas cooler on a downstream side.

Advantageous Effects of Invention

The present invention can provide a compressor module that is low weight and has a low center of gravity.

DESCRIPTION OF EMBODIMENTS

Figure 1:
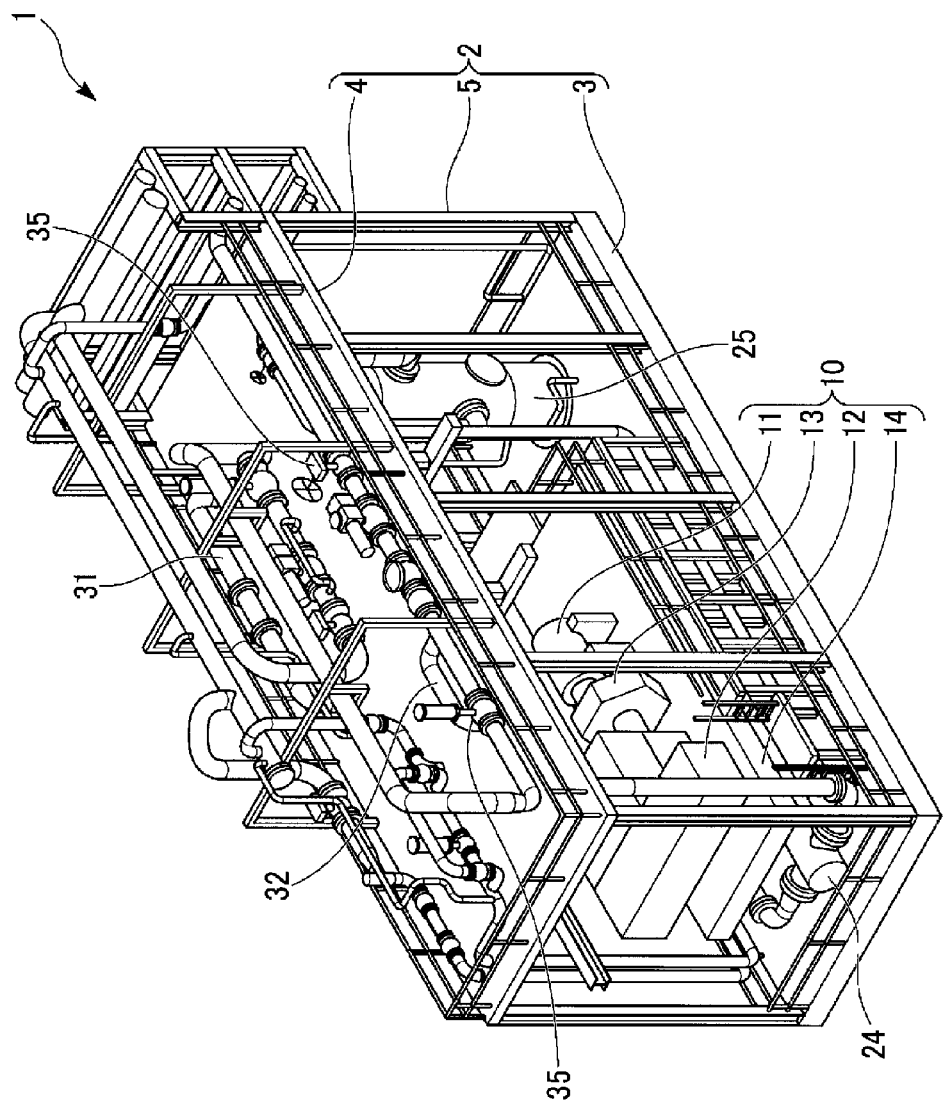
FIG. 1 is a perspective view of a compressor module according to an embodiment of the present embodiment.
Figure 2:
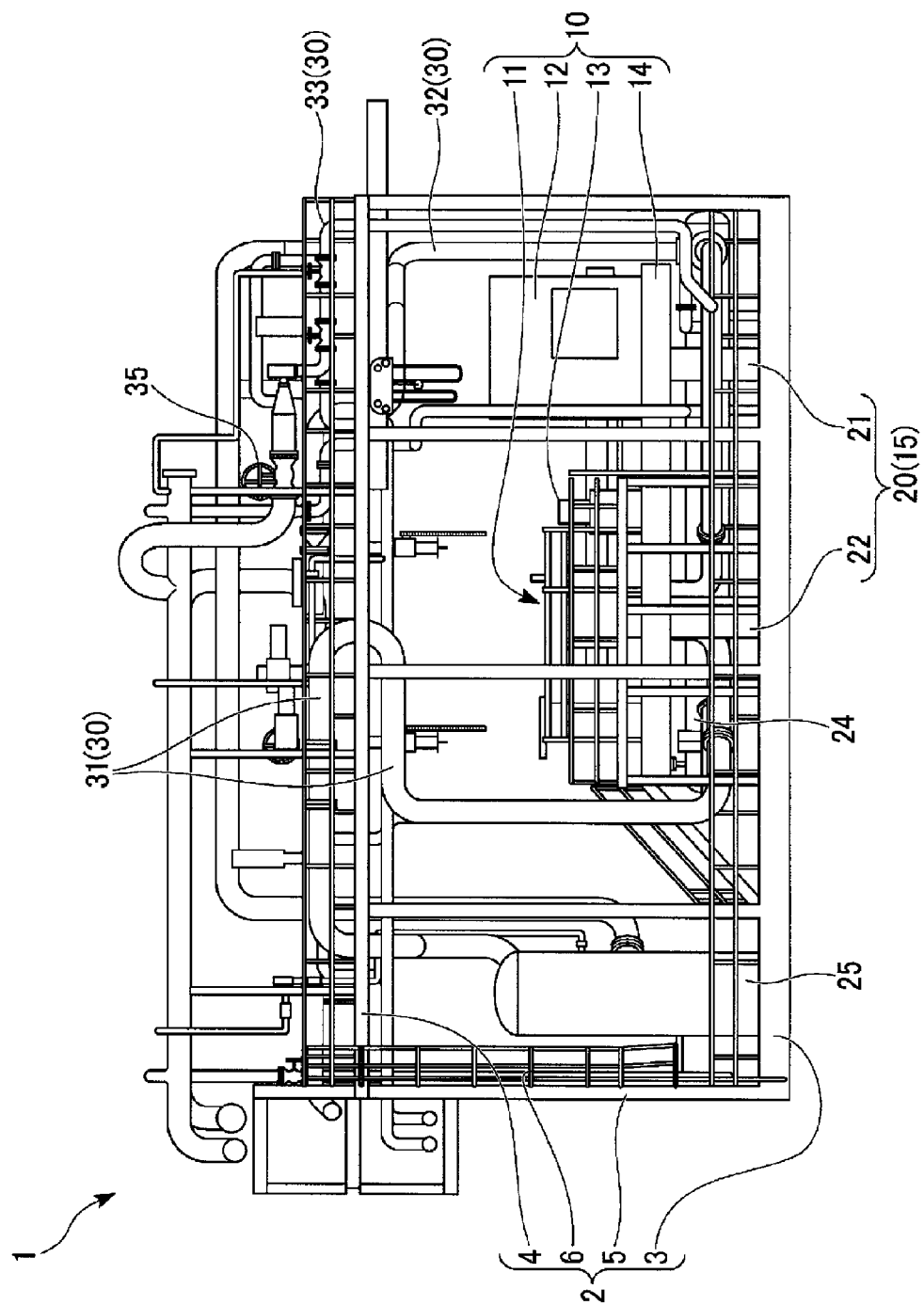
FIG. 2 is a side view of the compressor module.
Figure 3:
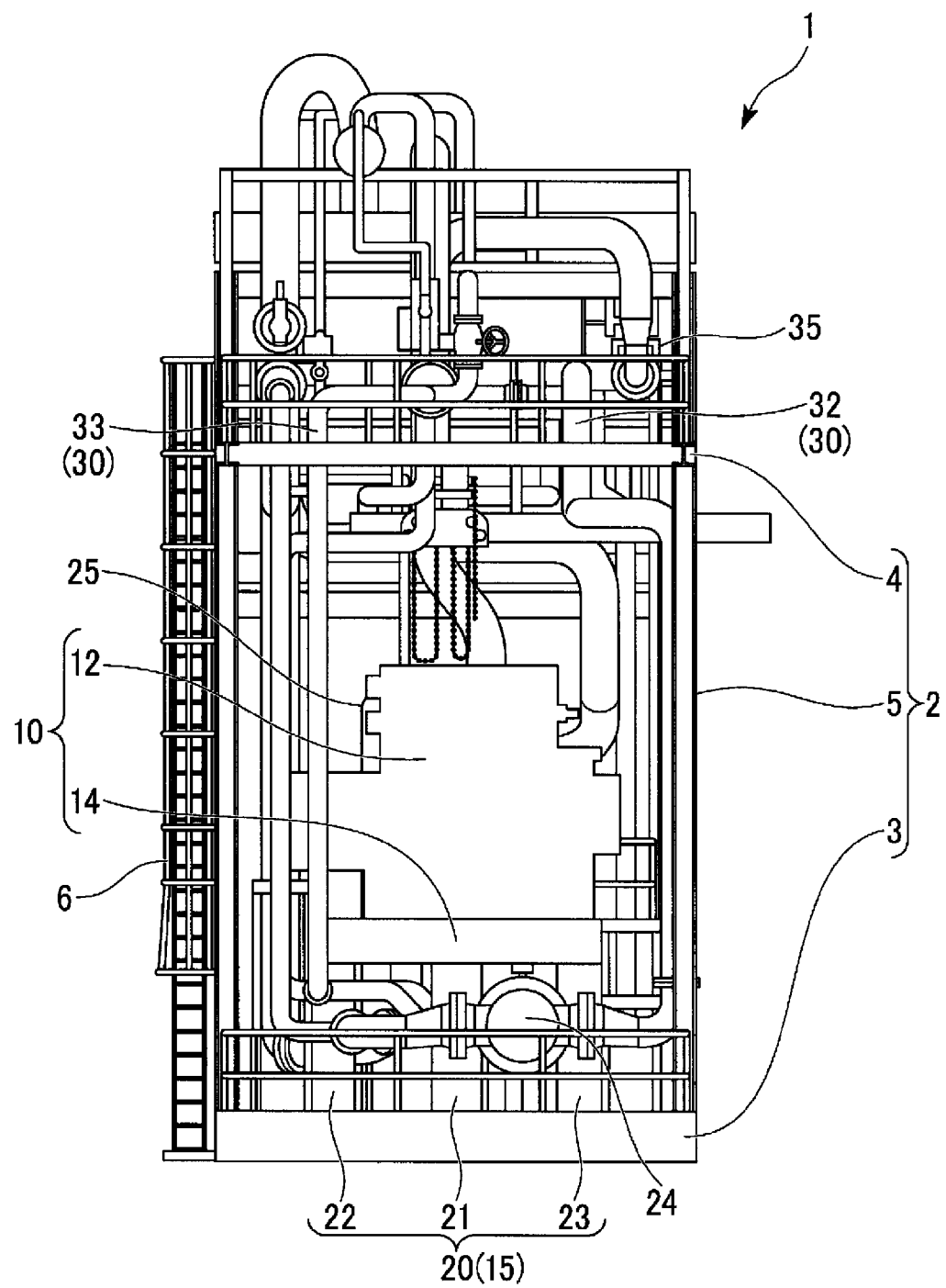
FIG. 3 is a front view of the compressor module.
Figure 4:
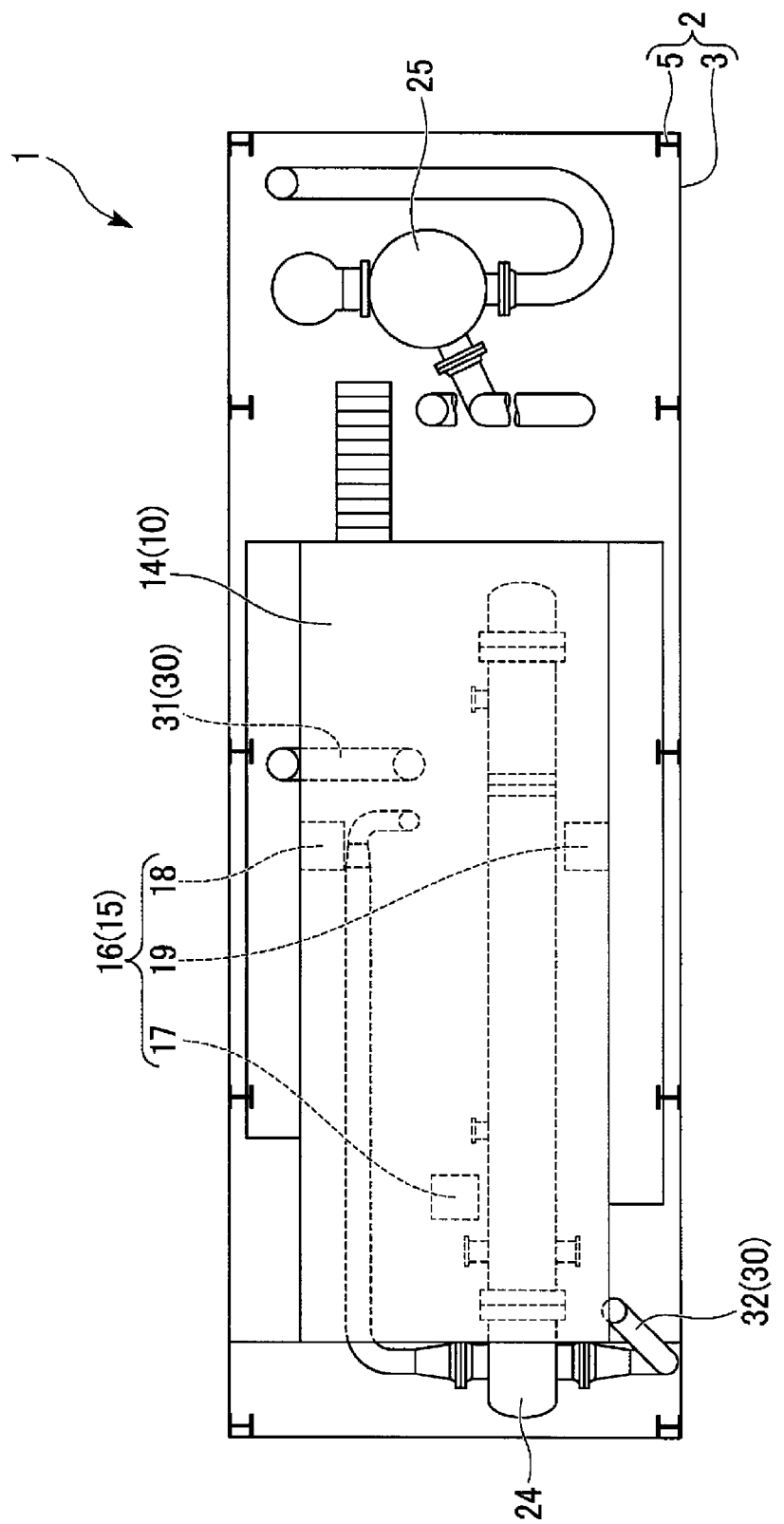
FIG. 4 is a schematic plan view of a base plate of the compressor module.

An embodiment of the present invention will be described. FIG. 1 is a perspective view of a compressor module 1 according to the present embodiment. FIG. 2 is a side view of the compressor module 1. FIG. 3 is a front view of the compressor module 1. FIG. 4 is a schematic plan view of a base plate 14 of the compressor module 1.

As illustrated in FIGS. 1 to 3, the compressor module 1 of the present embodiment includes a frame 2, a compressor skid 10, a leg portion 15 that supports the compressor skid 10, a gas cooler 24, a drain separator 25, a line portion 30, and a valve.

The frame 2 includes a first floor member 3 on which the compressor skid 10, the gas cooler 24, and the drain separator 25 are mounted and a second floor member 4 where a portion of the line portion 30 and the valve are disposed. The second floor member 4 is located above the first floor member 3. The frame 2 also includes a support 5 coupled to the first floor member 3 and the second floor member 4.

The first floor member 3 is the floor member located at the bottom layer of the frame 2 of the compressor module 1.

The second floor member 4 is disposed on the side of the compressor skid 10 opposite to where the first floor member 3 is located.

Operation or maintenance workers for the compressor module 1 can stand on the first floor member 3 and the second floor member 4. Additionally, the first floor member 3 and the second floor member 4 are connected via an ascent/descent device 6 such as a ladder, stairs, or an elevator.

The compressor skid 10 is disposed on the side of the gas cooler 24 opposite to where the first floor member 3 is located, and connected to the gas cooler 24 on the upstream side.

The compressor skid 10 includes a compressor 11 that raises the pressure of the gas and sends it to the gas cooler 24, a drive unit 12 that drives the compressor 11, and the base plate 14 on which the compressor 11 and the drive unit 12 are mounted. The configuration of the compressor 11 and the drive unit 12 are not particularly limited. Additionally, in the present embodiment, the drive unit 12 is a device that generates rotational driving force, and the compressor 11 and the drive unit 12 are connected via a speed increaser 13 that increases the speed of the drive unit 12.

The base plate 14 is a rigid body on which the compressor 11 and the drive unit 12 are mounted. Note that the base plate 14 is not required to have a planar shape. A damping device 16 is fixed on the base plate 14 at three different positions spaced apart from one another. In the present embodiment, a tank (not illustrated) of lubricating oil for the compressor 11, drive unit 12, and the like may be mounted on the base plate 14.

The leg portion 15 illustrated in FIGS. 3 and 4 is coupled to the compressor skid 10 and fixed to the first floor member 3. The leg portion 15 includes the damping device 16 fixed to the base plate 14 and a coupling member 20 fixed to the damping device 16 and fixed to the first floor member As illustrated in FIG. 4, the damping device 16 includes a first damping device 17 fixed to the base plate 14, a second damping device 18 fixed to the base plate 14 at a position spaced from the first damping device 17, and a third damping device 19 fixed to the base plate 14 at a position spaced from both the first damping device 17 and the second damping device 18. The damping devices 16 are configured to allow the coupling members 20 and the base plate 14 to move relative to one another in the horizontal direction and/or the vertical direction.

The coupling member 20 includes a first coupling member 21 that couples to the first damping device 17 and the first floor member 3, a second coupling member 22 that couples to the second damping device 18 and the first floor member 3, and a third coupling member 23 that couples to the third damping device 19 and the first floor member 3. The coupling members 20 have enough strength to support the compressor skid 10, taking into account the weight of the compressor skid 10, vibrations in the compressor module 1, and the like.

The first coupling member 21, the second coupling member 22, and the third coupling member 23 of the leg portion 15 support the compressor skid 10 to provide a gap in the height direction between the first floor member 3 and the compressor skid 10 to dispose the gas cooler 24.

The gas cooler 24 is mounted on the first floor member 3. In the present embodiment, the gas cooler 24 is fixed to the first floor member 3. The gas cooler 24 is disposed so that at least a portion thereof is located within the space formed between the first coupling member 21, the second coupling member 22, and the third coupling member 23. Specifically, in the present embodiment, the gas cooler 24 is disposed to pass through an internal region of a triangle whose points correspond to the first coupling member 21, the second coupling member 22, and the third coupling member 23, when the base plate 14 is viewed in a plan view. The gas cooler 24 is disposed at a position spaced apart from the first coupling member 21, the second coupling member 22, and the third coupling member 23. The gas cooler 24 is connected to a line 33 for delivering a refrigerant (a cooling fluid in the present embodiment). Additionally, although not illustrated, a heat exchanger (for example, a radiator) for transferring the heat of the gas entering the gas cooler 24 to the cooling fluid is disposed inside the gas cooler 24.

The drain separator 25 is fixed to the first floor member 3 and connected to the gas cooler 24 on the downstream side. The drain separator 25 separates the liquid component and the gas component contained in the gas cooled by the gas cooler 24.

The line portion 30 includes at least a first line 31 mounted on the second floor member 4 through which gas supplied to the compressor skid 10 flows, and a second line 32 mounted on the second floor member 4 through which gas supplied from the gas cooler 24 flows. Additionally, in the present embodiment, the line portion 30 further includes the line 33 disposed on the second floor member 4 for supplying refrigerant (cooling fluid) used by the gas cooler 24.

A valve 35 is disposed on the second floor member 4 for changing the flow rate of the gas in the line portion 30. The valve 35 is not limited to any particular configuration. For example, the valve 35 can regulate the flow rate of the gas in the first line 31, the flow rate of the gas in the second line 32, and the like. In the present embodiment, the main valve 35 which is important for operation and maintenance of the compressor module 1 is disposed on the second floor member 4. Note that a portion of the valve 35 may be disposed on the first floor member 3 as necessary.

In the compressor module 1 of the present embodiment, the compressor skid 10, the gas cooler 24, and the drain separator 25 are all provided on the first floor member 3. As a result, the center of gravity of the compressor module 1 is low. By disposing the heavy objects of the compressor module 1 on the bottom layer floor member (first floor member 3 in the present embodiment) of the plurality of floor members 3, 4, high stability is provided to the compressor module 1 when installed on a marine vessel or floating object and for operation after installation.

Additionally, in the present embodiment, by disposing the gas cooler 24 in the gap between the compressor skid 10 and the first floor member 3 formed by the leg portion 15 supporting the compressor skid 10, dead space is reduced. Dead space formed between the compressor skid 10 and the first floor member 3 means space required to allow the base plate 14 of the compressor skid 10 and the first floor member 3 to move relative to one another in an embodiment in which the compressor skid 10 is coupled to the first floor member 3 via the damping device 16. In the present embodiment, this dead space is used to dispose the gas cooler 24.

In the present embodiment, the total length of the line portion 30 can be reduced and the compressor module 1 can be made lighter compared to a configuration in which the compressor skid 10 and the gas cooler 24 are disposed on different floor members.

In the present embodiment, the load on the support 5 that connects the floor members 3, 4 is reduced compared to a configuration in which the compressor skid 10 and the gas cooler 24 are disposed on different floor members 3, 4.

In the present embodiment, by disposing all of the heavy objects of the compressor module 1 on the first floor member 3, the distance between heavy objects is reduced and the moment of inertia of the compressor module 1 is reduced.

In the present embodiment, by the coupling members 20 being fixed to the first floor member 3 and the coupling members 20 being coupled to the base plate 14 via the damping devices 16, the position of the coupling members 20 relative to the gas cooler 24 does not change and the coupling members 20 and the gas cooler 24 are not brought into contact by vibrations strong enough to move the compressor skid 10 relative to the first floor member 3.

In the present embodiment, by the base plate 14 being supported by the leg portion 15 at three positions on the base plate 14 spaced apart from one another, the leg portion 15 can be made light, and the base plate 14 can be stably supported.

In the present embodiment, by the valve 35 that adjusts the flow rate of the gas in the line portion 30 being disposed on the second floor member 4, the frequency with which a worker has to travel between the first floor member 3 and the second floor member 4 to adjust to opening amount of the valve 35 is reduced and maintenance is made easier.

Note that in the present embodiment, an example in which the drain separator 25 is disposed on the first floor member 3 is given. However, if the function of the drain separator 25 is unnecessary, the drain separator 25 is not required to be provided. Additionally, the drain separator 25 may not be fixed to the first floor member 3. For example, the drain separator 25 may be disposed on the second floor member 4.

Furthermore, in the present embodiment, an example in which the gas cooler 24 is fixed on the first floor member 3 is given. However, the gas cooler 24 may be fixed to the base plate 14 and coupled to the first floor member 3 via the base plate 14. In such embodiments, the same effect of the present embodiment is achieved by either providing sufficient space for the leg portion 15 and the gas cooler 24 to not come into contact or disposing the damping devices 16 between the coupling members 20 and the first floor member 3 so that the coupling members 20 and the base plate 14 move in an integral manner relative to the first floor member 3.

INDUSTRIAL APPLICABILITY

Embodiments of the present invention can be applied to a module in which a skid mounted apparatus and an apparatus connected to the skid mounted apparatus are assembled.

REFERENCE SIGNS LIST

1 Compressor module
2 Frame
3 First floor member
4 Second floor member
5 Support
6 Ascent/descent device
10 Compressor skid
11 Compressor
12 Drive unit
13 Speed increaser
14 Base plate
15 Leg portion
16 Damping device
17 First damping device
18 Second damping device
19 Third damping device
20 Coupling member
21 First coupling member
22 Second coupling member
23 Third coupling member
24 Gas cooler
25 Drain separator
30 Line portion
31 First line
32 Second line
33 Line
35 Valve

The invention claimed is:

1. A compressor module, comprising:
a first floor member;
a gas cooler mounted on the first floor member;
a compressor skid disposed on a side of the gas cooler opposite to where the first floor member is located, the compressor skid being connected to the gas cooler;
a second floor member disposed on a side of the compressor skid opposite to where the first floor member is located;
a first line mounted on the second floor member through which a gas supplied to the compressor skid flows;
a second line mounted on the second floor member through which a gas supplied from the gas cooler flows; and
a valve disposed on the second floor member for changing a flow rate of a gas in the first line and/or the second line;
a drain separator fixed to the first floor member and connected to the gas cooler on a downstream side;
supports coupled to the first floor member and the second floor member: and
three leg portions connected to the compressor skid and fixed to the first floor member that support the compressor skid, the leg portions providing a gap to dispose the gas cooler between the first floor member and the compressor skid, wherein
the compressor skid comprises
a compressor that raises pressure of a gas and sends the gas to the gas cooler,
a driver that drives the compressor, and
a base plate on which the compressor and the driver are mounted;
each of the leg portions comprises
a damper fixed to the base plate, and
a coupling fixed to the damper and fixed to the first floor member, and wherein
the first floor member is the bottom layer member of the compressor module.

2. The compressor module according to claim 1, wherein
the damper comprises
a first damper,
a second damper disposed at a position spaced away from the first damper, and
a third damper disposed at a position spaced away from the first damper and the second damper;
the coupling comprises
a first coupling that couples to the first damper and the first floor member,
a second coupling that couples to the second damper and the first floor member, and
a third coupling that couples to the third damper and the first floor member; and
at least a portion of the gas cooler is disposed within a space formed between the first coupling, the second coupling, and the third coupling.

* * * * *